United States Patent [19]

Ichimura et al.

[11] 4,348,864
[45] Sep. 14, 1982

[54] TANK ASSEMBLY FOR HYDRAULIC SYSTEM

[75] Inventors: Masaaki Ichimura; Yasumasa Tarumizu; Kiyouzi Uranaka, all of Kawasaki, Japan

[73] Assignee: Kabushiki Kaisha Komatsu Seisakusho, Tokyo, Japan

[21] Appl. No.: 140,441

[22] Filed: Apr. 17, 1980

[30] Foreign Application Priority Data

Apr. 17, 1979 [JP] Japan .................. 54-50095[U]

[51] Int. Cl.³ .............................. B01D 35/06
[52] U.S. Cl. ...................... 60/454; 210/168; 210/223
[58] Field of Search ............. 60/453, 454, 486; 137/546, 549, 563, 567, 573, 574; 210/222, 223, 521, 532.1, 168

[56] References Cited

U.S. PATENT DOCUMENTS

| | | | |
|---|---|---|---|
| 1,202,050 | 10/1916 | Gamble | 137/565 |
| 1,802,847 | 4/1931 | Stolte | 210/168 |
| 1,892,185 | 12/1932 | Clements | 210/168 |
| 2,119,013 | 5/1938 | Kerns et al. | 210/521 |
| 2,426,817 | 9/1947 | Charlton et al. | 210/168 |
| 2,599,680 | 6/1952 | Weeks | 137/567 |
| 2,959,008 | 11/1960 | Caroli | 60/453 |
| 2,989,066 | 6/1961 | Norlin | 137/567 |
| 3,411,293 | 11/1968 | Akins | 60/454 |
| 3,851,662 | 12/1974 | Jessop | 137/563 |
| 3,962,870 | 6/1976 | Lech | 60/486 |
| 4,036,758 | 7/1977 | Combest | 210/223 |
| 4,136,011 | 1/1979 | Joseph et al. | 210/168 |
| 4,194,518 | 3/1980 | Iwanaga et al. | 137/546 |
| 4,210,176 | 7/1980 | Emming | 137/574 |

Primary Examiner—H. Jay Spiegel
Attorney, Agent, or Firm—Armstrong, Nikaido, Marmelstein & Kubovcik

[57] ABSTRACT

A tank assembly for a hydraulic system including a hydraulic load device and a transmission. The tank assembly comprises a tank, a weir mounted on the bottom wall of the tank, which weir functions as a partition wall for dividing the inside of the tank into a first and a second reservoirs and allows fluid to overflow from the first reservoir to the second reservoir, the first reservoir being adapted to receive fluid from both the hydraulic load device and the transmission, a dust collector mat disposed on the bottom wall of the tank for collecting dust from drained fluid, and a strainer mounted inboard on one of the side walls of the tank and extending within the second reservoir.

10 Claims, 3 Drawing Figures

TANK ASSEMBLY FOR HYDRAULIC SYSTEM

BACKGROUND OF THE INVENTION

This invention relates to a hydraulic fluid tank assembly, and more particularly, to a hydraulic fluid tank assembly for use in hydraulic circuit for implement and that for transmission.

In the hydraulic circuit for implement of the kind specified which has heretofore been used, a fluid return conduit extending from hydraulic load devices is connected to the upper part of a hydraulic fluid tank, and a suction port formed near the bottom part of the tank is connected to a suction port of a pump, the delivery port of which is connected through a filter to the hydraulic load devices. Therefore, the dust such as metallic chips or particles produced by wear-down of the hydraulic load devices such as brake disks will directly enter the hydraulic fluid tank. Part of the dust will settle on the bottom of the tank, but major part of the dust is drawn into the pump thereby causing scratches or abnormal wear in the component parts of the pump.

Whilst, in the conventional hydraulic circuit for transmission, an oil pan of the transmission is provided with a strainer and the suction side of the pump is connected to the strainer and its delivery side is connected through a filter to the transmission. Therefore, the dust produced in the transmission such as metallic chips or particles due to wear-down of the brake disk and the gears will drop into the central part of the oil pan and settle in part on the bottom thereof, however, the major part of the dust will enter the strainer and is removed thereby to some degree and is then sent into the pump thereby causing scratches or abnormal wear in the component parts of the pump. Thus, in both the hydraulic circuits, dust tends to be sent into the respective pumps and therefore there occurs the aforementioned trouble.

Whilst, construction vehicles have a hydraulic circuit for implement and that for transmission which are separately provided and each of which has an independent hydraulic fluid tank. Therefore, such construction is disadvantageous in that a larger space is required for provision of hydraulic fluid tanks, the use of a larger amount of hydraulic fluid becomes necessary, and troublesome control of the amount of the hydraulic fluid is required.

To eliminate the above-mentioned disadvantage, it is considered to employ a hydraulic fluid tank for common use in both hydraulic circuits for implement and transmission. However, if the dust such as metallic chips or particles etc. produced in the hydraulic circuit for transmission is sent into the hydraulic circuit for implement, there is a possibility of occurrence of breaking of high pressure seals, and therefore the common use of the hydraulic fluid tank for both hydraulic circuits is in fact undesirable.

SUMMARY OF THE INVENTION

It is therefore an object of the present invention to provide a tank assembly for a hydraulic system wherein dust and impurities can effectively be removed from the circulated fluid and purified fluid is supplied to a hydraulic pump.

Another object of the present invention is to provide a single tank assembly for a hydraulic system including a hydraulic load device and a transmission wherein the circulated fluid is purified in the tank assembly and fed into hydraulic pumps for both the hydraulic load device and the transmission.

In accordance with an aspect of the present invention, there is provided a tank assembly for a hydraulic system, comprising: a tank having a bottom and side walls; a partition wall for dividing the inside of said tank into a first and a second reservoirs, said first reservoir being adapted to receive fluid from said hydraulic system; dust collector mat means disposed on the bottom wall of said tank for collecting dust from drained fluid and keeping it therein; strainer means mounted inboard on one of the side walls of said tank within said second reservoir, said strainer means including a magnet formed therein; and means for communicating said first reservoir with said second reservoir.

In the first embodiment, the communicating means comprises a weir for allowing fluid to overflow from said first reservoir to said second reservoir and in this case the weir functions as the partition wall as well.

In the second embodiment, the communicating means comprises a scavenging pump for pumping fluid from said first reservoir to said second reservoir.

The above and other objects, features and advantages of the present invention will be readily apparent from the following description taken in conjunction with the accompanying drawings.

DESCRIPTION OF THE PREFERRED EMBODIMENTS

Figure 1:
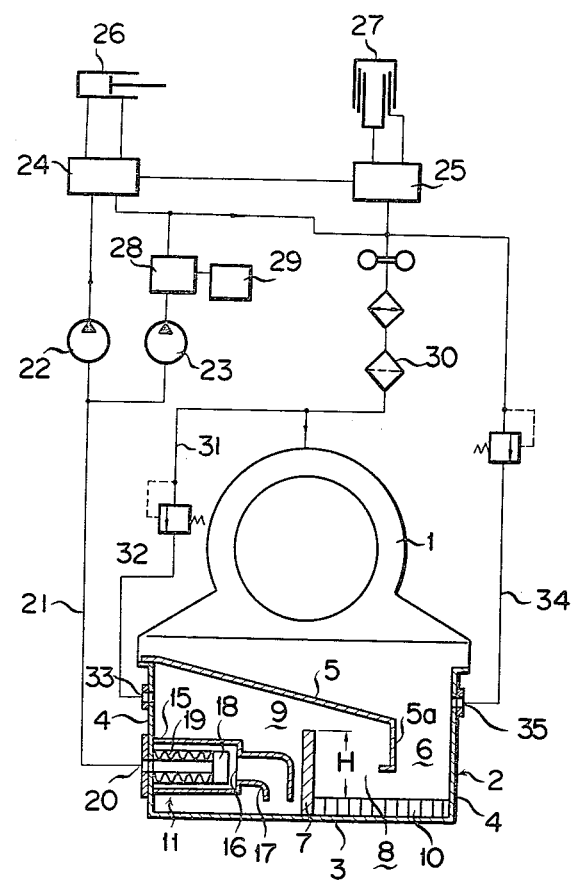
FIG. 1 is a schematic representation of a hydraulic system employing a tank assembly of the present invention wherein the tank assembly is shown in cross-section.

The present invention will now be described below by way of example only with reference to the accompanying drawings.

Fixedly secured under a transmission 1 is a hydraulic fluid tank 2 forming an oil pan. The hydraulic fluid tank 2 is constructed as follows.

The tank 2 is of an open-top box shape formed by a bottom wall 3 and side walls 4. A downwardly inclined cover 5 extends from the open-top part with its one end portion 5a and one of the side walls 4 forming a drop hopper 6. Located in the central part of the bottom wall 3 is an weir 7 dividing the tank 2 into a first chamber 8 and a second chamber 9.

Figure 2:
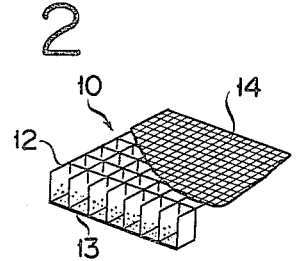
FIG. 2 is a perspective view of a dust collector mat used in the tank assembly.

A part of the first chamber 8 is located below the drop hopper 6, and the chamber 8 has a dust collector mat 10 located therein. A strainer member 11 is located in the second chamber 9. The above-mentioned dust collector mat 10 comprises, as shown in FIG. 2, a plurality of sheet-shaped plates 12 assembled in grid form having a bottom plate 13 secured in the lower thereof and a wire gauze 14 secured in the upper part thereof. The strainer member 11 comprises a cylindrical body 15 having a suction pipe 17 secured to an inlet 16 thereof, a magnet 18 and a cylindrical filter 19 secured in the body 15, and an outlet 20 opening into the inner peripheral part of the filter 19 and which is attached to the side wall 4.

The outlet 20 is connected through a conduit 21 to a implement pump 22 and a transmission pump 23. The hydraulic fluid delivered by the implement pump 22 is supplied through a demand valve 24 and a hoist valve 25, respectively, into hydraulic load devices 26 and 27. Whilst, the hydraulic fluid deliverred by the transmission pump 23 is supplied into a torque converter 28 and a valve 29 for the transmission and flows through a filter 30 into the transmission 1.

Reference numeral 31 denotes a bypass-conduit connected to the outlet side of the filter 30 and including a bypass-valve 32 for returning clean fluid through a first inlet port 33 formed in the side wall 4 into the second chamber 9.

Reference numeral 34 indicates a fluid return conduit for the hydraulic load devices 26 and 27 which is connected through a second inlet port 35 formed in the side wall 4 to the first chamber 8.

Thus, the return fluid containing dust such as copper alloy chips produced by wear-down of the disk in the transmission, iron chips produced by wear-down of the gears, casting sand remaining in the hydraulic circuit and shavings produced by machining etc. will flow through the second inlet port 35 and along the cover 5 and also through the drop hopper 6 into the first chamber 8. Such dust will settle in the dust collector mat 10 because its specific gravity is larger than that of the fluid and is trapped by the wire gauze 14 so as not to float easily. When the level of the fluid exceeds the height H of the weir 7, the fluid will overflow the weir 7 into the second chamber 9. The height H of the weir 7 is predetermined so as not to allow the fluid flowing in the upper part of the weir to float the dust settled in the dust collector mat 10. The fluid collected in the second chamber 9 is drawn through the suction pipe 17 into the strainer member 11. After the iron chips or particles contained in the fluid is attracted by the magnet 18 and other kinds of dust is removed by the filter 19, the fluid is sent through the outlet 20 into the pumps 22 and 23. Therefore, there is no opportunity for such dust to enter the pumps 22 and 23.

Thus, even if the hydraulic fluid tank is used commonly for the hydraulic circuit for implement and that for the transmission, metallic chips or particles produced in the transmission will not be sent into the hydraulic circuit for implement.

Besides, because part of the fluid which is passed through the filter 30 flows directly into the second chamber 9, the fluid which is not contaminated so much can be returned into the hydraulic fluid tank separately from the fluid which has passed through the transmission 1, thereby enabling the dust separation efficiency in the first chamber 8 to be improved considerably.

Figure 3:
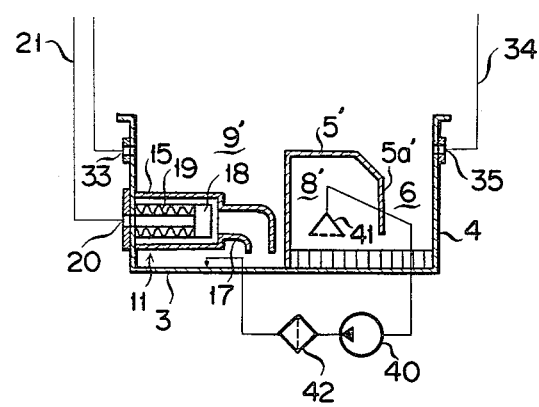
FIG. 3 is a cross-sectional view of another tank assembly of the present invention.

Referring to FIG. 3, there is shown another embodiment of the present invention. In the aforementioned first embodiment, the fluid flows from the first chamber 8 into the second chamber 9 by overflowing the weir 7, however, in the second embodiment, the fluid in a first chamber 8' is sent into a second chamber 9' by driving a scavenging pump 40. When the fluid flows into the first chamber 8', the dust contained therein will settle in the dust collector mat thereby purifying the fluid. By driving the scavenging pump 40, the purified fluid is drawn out from the first chamber 8' through a suction filter 41 and is sent through a filter 42 into the second chamber 9'. The other components of this embodiment are same as those of the first embodiment.

As described in detail hereinabove, according to the present invention, the dust contained in the fluid returning from the hydraulic load devices can be removed, and purified fluid can be sent to the pumps, and also the construction of the hydraulic fluid tank can be simplified together with improving the durability of the pumps.

It is to be understood that the foregoing description is merely illustrative of preferred embodiments of the invention, and that the scope of the invention is not to be limited thereto, but is to be determined by the scope of the appended claims.

What we claim is:

1. A tank assembly for a hydraulic system, comprising:
a tank having a bottom and side walls;
a partition wall for dividing the inside of said tank into a first and a second reservoirs, said first reservoir being adapted to receive fluid from said hydraulic system;
dust collector mat means disposed on the bottom wall of said tank in said first reservoir for collecting dust from drained fluid and keeping it therein;
strainer means mounted inboard on one of the side walls of said tank within said second reservoir, said strainer means including a magnet formed therein, said strainer means being adapted to supply fluid to said hydraulic system; and
means for communicating said first reservoir with said second reservoir.

2. A tank assembly as recited in claim 1 wherein said communicating means is a weir which functions as said partition wall as well.

3. A tank assembly as recited in claim 1 wherein said communicating means is a scavenging pump for pumping fluid from said first reservoir into said second reservoir.

4. A tank assembly as recited in claim 1, 2 or 3 wherein said dust collector mat means comprises a plurality of plates assembled in grid form and a wire gauze mounted on said grid-shaped plates.

5. A tank assembly for a hydraulic system including a hydraulic load device, a transmission, a first pump for said hydraulic load device and a second pump for said transmission, said tank assembly comprising:
a tank having a bottom and side walls;
a partition wall for dividing the inside of said tank into a first and a second reservoirs, said first reservoir being adapted to receive fluid from said hydraulic system;
dust collector mat means disposed on the bottom wall of said tank in said first reservoir for collecting dust from drained fluid and keeping it therein;
strainer means mounted inboard on one of the side walls of said tank within said second reservoir, said strainer means being adapted to supply fluid to said hydraulic system; and
means for communicating said first reservoir with said second reservoir.

6. A tank assembly as recited in claim 5 wherein said communicating means is a weir which functions as said partition wall as well.

7. A tank assembly as recited in claim 5 wherein said communicating means is a scavenging pump for pumping fluid from said first reservoir into said second reservoir.

8. A tank assembly as recited in claim 5, 6 or 7 wherein said dust collector mat means comprises a plurality of plates assembled in grid form and a wire gauze mounted on said grid-shaped plates.

9. A tank assembly as recited in claim 5 wherein fluid is drained into said first reservoir from both said hydraulic load device and said transmission and wherein purified fluid is fed into said first and second pumps from said second reservoir through said strainer means.

10. A tank assembly as recited in claim 9 wherein part of the fluid from said load device is directly introduced into said second reservoir bypassing said transmission.

* * * * *